J. J. MERRILL.
METHOD OF AND APPARATUS FOR MANUFACTURING DEXTRINE.
APPLICATION FILED APR. 23, 1917.
1,428,604.
Patented Sept. 12, 1922.
4 SHEETS—SHEET 2.
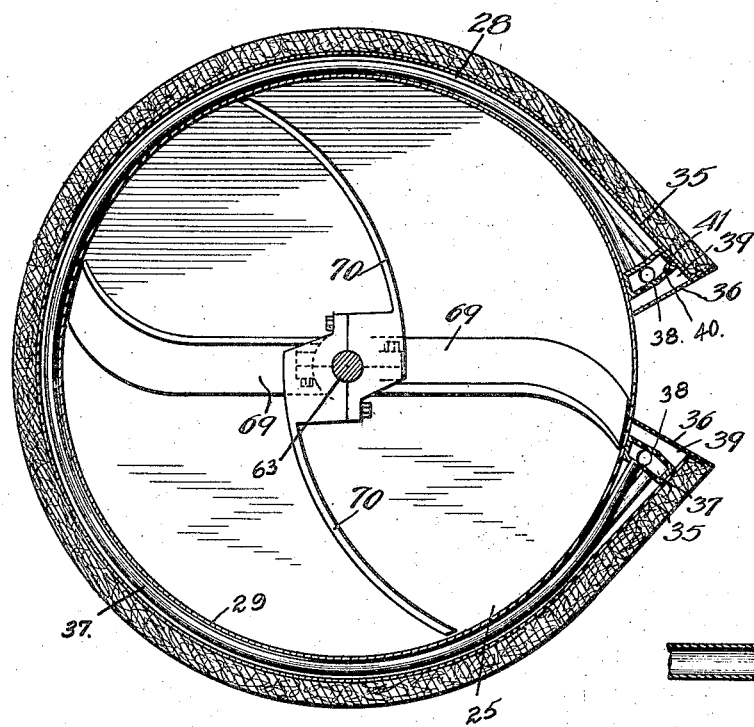
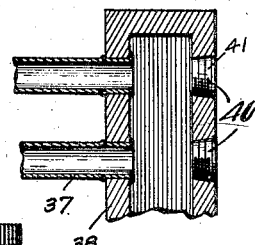
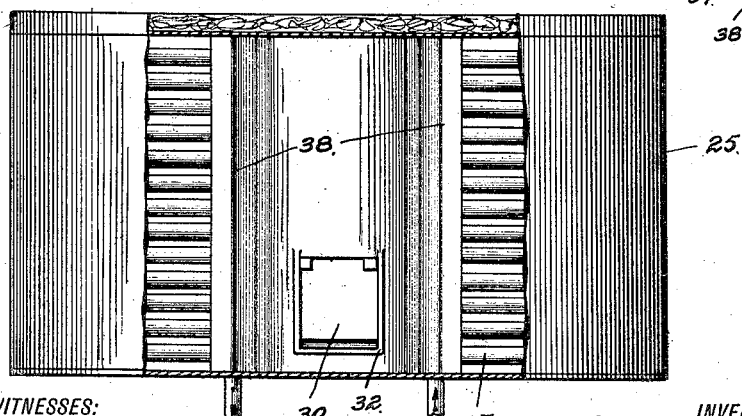
WITNESSES:
INVENTOR
Joseph J. Merrill
BY
Barnett Numan,
ATTORNEYS.

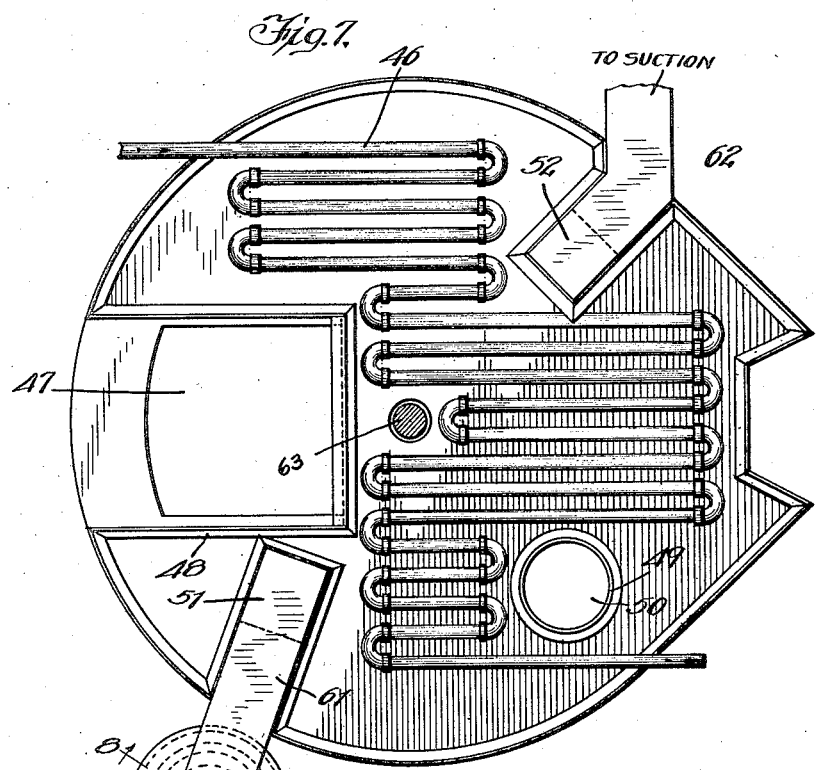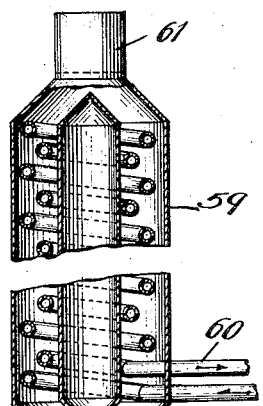

J. J. MERRILL.
METHOD OF AND APPARATUS FOR MANUFACTURING DEXTRINE.
APPLICATION FILED APR. 23, 1917.
1,428,604.
Patented Sept. 12, 1922.
4 SHEETS—SHEET 4.
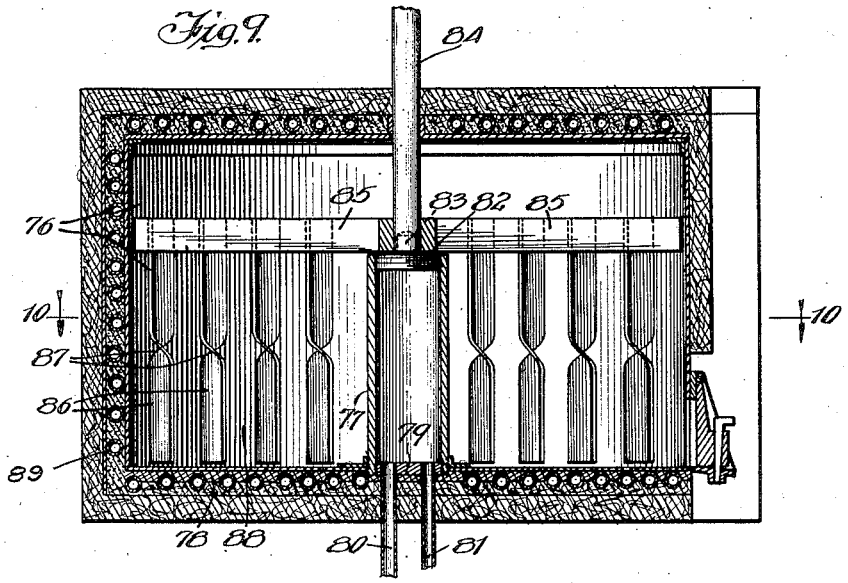
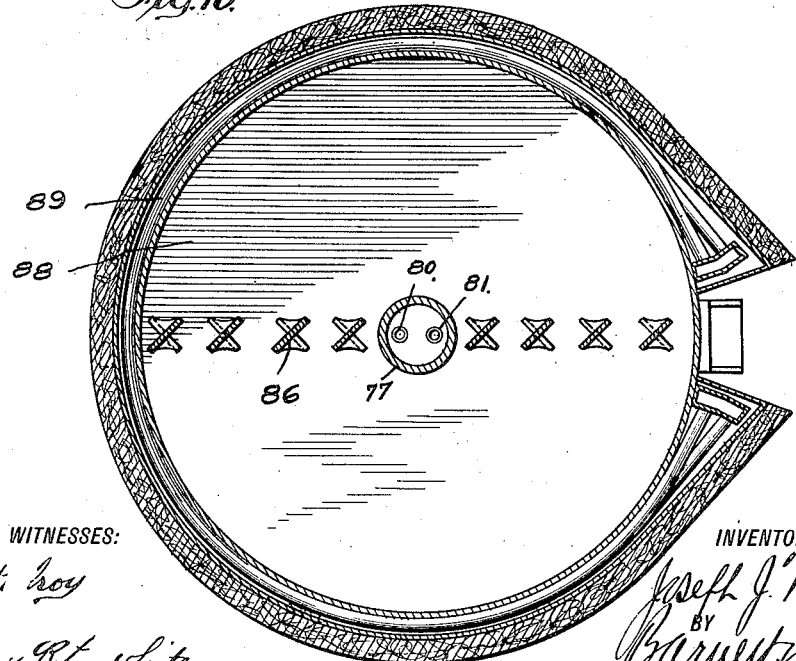
WITNESSES:
INVENTOR
Joseph J. Merrill
BY
ATTORNEYS Patented Sept. 12, 1922.

1,428,604

UNITED STATES PATENT OFFICE.

JOSEPH J. MERRILL, OF CHICAGO, ILLINOIS, ASSIGNOR TO CORN PRODUCTS REFINING COMPANY, A CORPORATION OF NEW JERSEY.

METHOD OF AND APPARATUS FOR MANUFACTURING DEXTRINE.

Application filed April 23, 1917. Serial No. 163,945.

*To all whom it may concern:*

Be it known that I, JOSEPH J. MERRILL, a citizen of the United States, residing at Chicago, in the county of Cook and State of Illinois, have invented certain new and useful Improvements in Method of and Apparatus for Manufacturing Dextrine, of which the following is a specification.

My invention relates to the manufacture of dextrine, and allied products, which are intended to be covered by the general term dextrine; and the object of the invention is to provide an improved form of apparatus for use in this industry, by means of which a purer, more homogeneous and, if desired, a whiter product may be obtained than has been heretofore possible when the manufacture is carried on on a commercial scale.

A further object is to make the process of manufacture more rapid and economical.

Dextrine is manufactured by roasting or heating starch which is usually acidulated, the material being kept in agitation during the process so as to prevent caking or gelatinization and the overheating of any portion thereof to the detriment of the product. If a uniform product is to be obtained, it is essential that the heat be applied equally to the entire batch under treatment. The starch, when introduced into the dextrinizing vessel, contains ordinarily some water—commercial starch has ordinarily a moisture content of about seven to thirteen per cent by weight—besides which there is the nitric or hydrochloric acid with which the starch is ordinarily acidulated. This moisture is vaporized by the heating operation, and there is a tendency always for the vapors to condense, particularly against the top wall of the vessel. If this takes place, the drops of water of condensation falling back into the material form gelatinized or partially gelatinized lumps, with the result that the product is not homogeneously dextrinized throughout and requires bolting. It is one of the objects of my invention to provide an apparatus for making dextrine in which condensation of the vapors developed during the process is prevented.

A further object is to apply the heat at a higher temperature than usual so as to make the manufacture rapid and to utilize a form of apparatus of economical construction which will permit the use of relative high temperatures, A further object is to provide means for thoroughly agitating the material to further insure the uniform treatment of the whole batch.

Further incidental objects of my invention will be apparent from the following description of the preferred embodiments thereof shown in the accompanying drawings. In these drawings—

Fig. 4 is a sectional plan on line 4—4 of Fig. 1.

Fig. 5 is a detail sectional view illustrating the manner in which the side wall heating pipes are connected wth the headers through which the pipes are supplied with steam.

Fig 6 is a front elevation of the apparatus with certain parts broken away.

Fig. 7 is a top plan view.

Fig. 8 is a vertical sectional view on line 8—8 of Fig. 7.

Fig. 9 is a vertical sectional view taken on a diametrical line illustrating a dextrinizing apparatus of modified construction, and Fig. 10 is a sectional plan on line 10—10 of Fig. 9.

Like characters of reference designate like parts in the several figures of the drawings.

Figure 1:
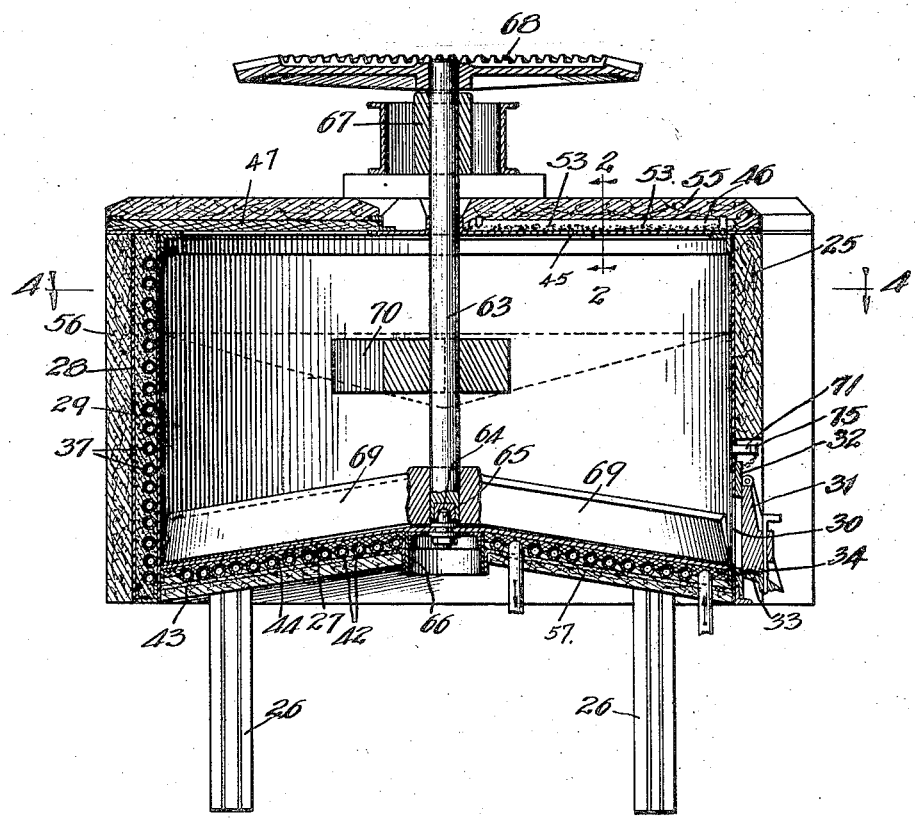
Fig. 1 is a vertical sectional view of one form of dextrinizing apparatus constructed in accordance with my invention.
Figure 2:
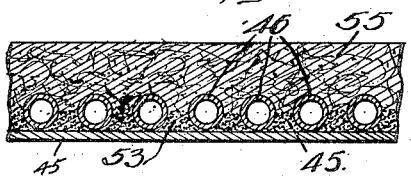
Fig. 2 is a detail sectional view, on an enlarged scale, taken on line 2—2 of Fig. 1.
Figure 3:
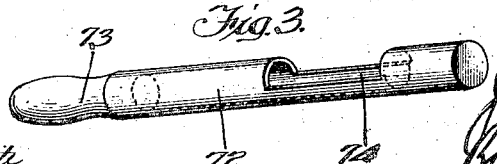
Fig. 3 is a detail view, in perspective, of an appliance for taking a sample from the dextrinizing vessel during the process.

Referring first to Figs. 1 to 8, inclusive, the dextrinizing vessel 25 is shown as supported on suitable supports 26, the vessel being constructed of sheet metal boiler plates secured together and reinforced by angle irons. The bottom sheet 27 is preferably crowned so that it slopes from a central point down toward the side wall of the vessel. The purpose of this is to give a quick discharge which is important as the conversion of the product continues as long as it remains in the vessel. The side wall of the vessel consists, preferably, of an outer sheet 28 and an inner sheet 29, the latter being formed with a door opening 30 adapted to be closed by a door 31 hinged to a door frame casting 32 and adapted to be latched to an angle plate 33 by a latch bolt 34. The ends 35 of the outer end wall sheet 28 are straight for a certain distance and terminate at and are secured to upright plates 36 at opposite sides of the door just mentioned. The inner and outer side wall sheets 28, 29 are spaced apart to make room for steam pipes 37 which are headed into or otherwise secured in a suitable manner to vertically placed headers 38 arranged in the enlarged spaces 39 between the extremities 35 of the outer sheet and the inner sheet. These steam pipes have straight ends in a staggered arrangement to give sufficient room for heading over the pipes and the headers are so formed that the pipes stand at right angles to the portions of the headers to which they are united. To permit the upsetting of the pipes the headers are formed with openings 40 which are subsequently closed by screw plugs 41 (Figs. 4 and 5). The space within the side wall of the vessel in which the steam pipes 37 are located is preferably filled with some heat conducting material, for example, iron filings this material serving to bring the heat of the steam in the pipes to the inner sheet 29 of the wall by direct conduction. This construction is much cheaper than a steam jacket and is equally as efficient. It permits high pressure steam to be used which makes the process rapid.

The bottom of the vessel might be made in the same manner. Preferably, however, as shown, the bottom heating coil 42 is supported on slate 43 and a body of lead 44 is employed as a heat conducting material between the pipes and the bottom sheet 27.

On the top or cover sheet 45 of the vessel is a steam coil 46 ararnged so as to cover as much of the top of the vessel as possible. In the construction shown the top of the vessel has a man-hole which is covered by a gate 47 made of wood, this gate being slidably aranged in guides 48. 49 is a starch inlet provided with a cover 50, and 51, 52 are openings, the purpose of which will be explained below. The coil 46 is arranged to cover practically all of the top of the vessel except at these several openings. The purpose of this coil is to keep the top wall of the vessel warm so that the vapors within the vessel will not condense thereon. The gate 47 is made of wood to minimize condensation. Preferably a body 53 of heat conducting material, iron filings, for example, is placed on the plate 45 so as to embed or partially embed the heating coil. Over this is preferably a layer of heat insulating material 55 arranged above the coil. Similarly the side and bottom walls are covreed with bodies of insulation 56, 57. As a further means for preventing condensation of the vapors developed by the heating of the starch, I prefer to provide the apparatus with means for producing a draft of superheated air through the upper part of the vessel above the material. This expedient might be used instead of the heating of the top plate; but preferably both expedients are employed. The air is withdrawn therefrom by any suitable exhausting apparatus (not shown) through the opening 52. The in-going air passes through a pipe 58 into a heater 59 in which is arranged a steam coil 60. From the heater a pipe 61 leads to opening 51. 62 is a pipe leading from opening 52 to the exhausting apparatus. The air, being highly heated when it enters the dextrinizing vessel, will absorb a considerable amount of moisture which is carried out of the vessel in the form of steam or vapor. This air circulatory system also serves to dispose of the acid fumes which are more or less noxious.

Suitable means is provided for keeping the material under treatment in constant agitation. 63 is a shaft, the lower end of which is formed with a socket 64 whereby the shaft is revolubly supported on a stud 65 secured to the bottom sheet 27, the latter being reinforced at this point by an annular structure 66. The upper end of the shaft is guided in a bearing 67 on the top of the vessel. The shaft is provided with a crown pinion 68 by means of which it is revolved. Bolted to the lower end of the shaft are obliquely disposed agitator blades 69 the ends of which are curved backwardly and are also sloped backwardly with reference to the direction in which the blades are driven. Above the blades 69 is a pair of oppositely curved blades 70. The blades 69 tend to force the material outwardly toward the side wall of the vessel. The blades 70 carry the material inwardly. As a result there is a constant circulation or turning over of the material from the center to the circumference of the vessel and back again which prevents overheating of any part of the batch. By the arrangement used for mounting the shaft the agitator blades are kept from contact with the side and bottom walls of the vessel. During the dextrinizing process the starch becomes very dry and inflammable. Serious explosions have been caused by sparks produced by the striking of one metal part of the apparatus against another. The arrangement above described obviates the possibility of this by holding the agitator blades out of contact with the walls of the vessel.

For convenience in taking samples as the operation of dextrinizing proceeds, a tube 71 is set into the side wall of the vessel above the door. 72 is a cylindrical sample-taking device provided with a handle 73 and formed on one side with an opening 74. This device may be thrust into the vessel through tube 71 on removing the closure cap 75.

Operation: A batch of starch, after having been acidulated, is run into the dextrinizing vessel through the starch inlet 49, the agitator is set in rotation and steam turned into the steam coils. As the vapors are developed through the heating of the starch, they are carried out of the vessel by the draft of superheated air which enters through pipe 61 and is discharged through pipe 62. The side walls and top wall are heated so that there is no possibility of any condensation of the vapors. As a result of these arrangements it has been found possible to turn out a very high grade of dextrine even when the product is manufactured in large batches. The material under treatment is kept in constant agitation by blades 69 and 70 so that caking or the overheating of any portion of the batch is prevented.

In Figs. 9 and 10 I have shown a modified construction useful particularly for manufacturing certain grades of dextrine in which the starch contains a large percentage of moisture. Ordinarily, if the starch be quite moist, it is necessary to apply the heat gradually, otherwise the starch is likely to be gelatinized or caked. The apparatus shown in Figs. 9 and 10 permits the application of relatively high temperatures even to starch which is moist. The vessel 76 may be constructed on the same general principle as the dextrinizing vessel heretofore described, but is provided with a centrally arranged pipe 77 which projects upwardly through the bottom 78 of the vessel. The pipe is closed at the bottom by a plug 79 into which are fitted a steam supply pipe 80 and a discharge pipe 81 for water of condensation. The upper end of pipe 77 is closed with a plug 82 on which is a stud 83 forming a bearing for a revoluble shaft 84. Shaft 84 is provided with laterally extending arms 85, 85 to which are secured vertical agitating blades 86. These blades are preferably formed with a twist at 87 so that the lower portions of the blades tend to force the material in one direction while the upper portions of the blades tend to move the material backwardly in the other direction. The arrangement, therefore, produces a circulation or turning of the material from the center of the vessel outwardly and back again toward the center. It will be observed that the material is treated in an annular dextrinizing vessel 88, heat being applied not only to the outer wall of the chamber through steam pipes 89 but also to the center of the vessel by means of pipe 77. The agitator, except for blades 86, lies entirely above the material in the chamber so that the starch does not come into contact with any cold metal. It is for this reason, and because the heat is applied to the center of the mass as well as to its periphery, that it is possible to use a high temperature even with relatively moist starch.

The apparatus shown in Figs. 9 and 10 of the drawings and just described is not specifically claimed herein, being made the subject-matter of a copending application Serial No. 199,967, filed November 2, 1917.

While I have described my invention as embodied in two preferred forms of apparatus, it will be understood that further modifications might be made without departing from the invention as expressed in the claims appended hereto.

I claim:

1. In apparatus for manufacturing dextrine, the combination of a circular dextrinizing vessel having a door in its side wall, headers in upright arrangement on opposite sides of the door, and steam pipes arranged adjacent the side wall of the vessel surrounding the major part of the same and connected at opposite ends with said headers.

2. In apparatus for manufacturing dextrine, the combination of a circular dextrinizing vessel having a door in its side wall, headers in upright arrangement in opposite sides of the door, steam pipes arranged adjacent the side wall of the vessel surrounding the major part of the same and connected at opposite ends with said headers, and a heat conducting filler in contact with said pipes and wall.

3. In apparatus for manufacturing dextrine, the combination of a dextrinizing vessel having a circular, double side wall provided with a door, headers arranged on opposite sides of said door, and heating pipes within the space in said wall, the extremities of which are united with said headers.

4. Improvement in the method of manufacturing dextrine, which consists in heating the material in a closed vessel, applying heat to the top of the vessel to prevent condensation of moisture, and forcing a draft of superheated air across the material under treatment to absorb and carry off the vapors generated by the heating of said material.

5. Method of manufacturing dextrine which consists in turning a body of acidulated starch over and over in a container, the walls of which are highly heated, and producing a draft across the top of said body of material to carry off the vapors developed by heating said material.

6. Improvement in method of manufacturing dextrine which consists in producing a forced draft of highly heated air across the material under treatment for the purpose of absorbing and carrying off the vapors developed by the heating of the starch.

7. Improvement in the method of manufacturing dextrine which consists in applying heat to a body of relatively dry starch in a container, producing a continuous movement of the starch in the container from the center of the container toward the outer wall of the same and back to the center, and forcing a draft of dry air through the container to absorb and carry off the vapors developed by the heating of the starch.

8. Improvement in the method of manufacturing dextrine, which consists in applying heat to a body of starch in a container, producing a continuous movement of the starch in the container, preventing condensation of moisture within said container, and forcing a draft of superheated air through the container to absorb and carry-off the vapors developed by heating the starch.

9. In apparatus for manufacturing dextrine, the combination of a dextrinizing vessel, and agitating means therein comprising a shaft, a blade on said shaft near the bottom of the vessel which is curved backwardly, and sloped backwardly with reference to the direction of its movement, and a blade on said shaft above the first named blade which is curved in the opposite direction, both of said blades being supported out of contact with the walls of said vessel, for the purpose described.

10. Method of manufacturing dextrine which consists in turning a body of acidulated starch over and over in a container, the walls of which are highly heated and passing a heated gas capable of absorbing the vapors developed by the heating of the material, over the top of the body of material from side to side thereof.

JOSEPH J. MERRILL.